United States Patent [19]
Kalina

[11] Patent Number: 5,970,480
[45] Date of Patent: Oct. 19, 1999

[54] CENTRALIZED CREDIT INTERCHANGE SYSTEM OF CONVERTING PURCHASE CREDIT AWARDS THROUGH CREDIT EXCHANGE SYSTEM FOR PURCHASE OF INVESTMENT VEHICLE

[76] Inventor: Dyan T. Kalina, 115 S. Topanga Cyn. Blvd., Suite 186, Topanga, Calif. 90290

[21] Appl. No.: 08/839,467

[22] Filed: Apr. 14, 1997

[51] Int. Cl.[6] .................................................. B42D 15/00
[52] U.S. Cl. ................................. 705/37; 705/26; 705/27
[58] Field of Search ................................. 705/14, 26, 27, 705/37

[56] References Cited

U.S. PATENT DOCUMENTS

| | | | |
|---|---|---|---|
| 4,750,119 | 6/1988 | Cohen et al. | 364/401 |
| 5,233,514 | 8/1993 | Ayyoubi | 364/408 |
| 5,297,026 | 3/1994 | Hoffman | 364/408 |
| 5,466,919 | 11/1995 | Hovakimian | 235/380 |
| 5,471,669 | 11/1995 | Lidman | 235/383 |
| 5,483,049 | 1/1996 | Schulze, Jr. | 235/383 |
| 5,537,314 | 7/1996 | Kanter | 364/406 |
| 5,621,640 | 4/1997 | Burke | 395/214 |
| 5,774,870 | 6/1998 | Storey | 705/14 |

Primary Examiner—Thomas R. Peeso
Attorney, Agent, or Firm—Pretty, Schroeder & Poplawski, P.C.

[57] ABSTRACT

A debt credit award interchange system interfacing with a credit award exchange system for conversion of any form of merchant or creditor credit award resulting from consumer incurring debt due to consumer purchase of goods or services of creditor. The debtor earns a preassigned credit award per credit vehicle utilized and amount of purchased item. At central location of credit award interchange system, secured creditor debt credit award agreement contracts are matched with point of sale transaction purchases, utilizing data processing methods to increment consumer account, summing accumulations; debiting creditors, authorized and confirmed thru interchange system. Interchange system communicates accumulated credit awards to credit award exchange that processes the conversion of credit award into purchase of mutual funds and/or imvestment vehicle of award account holder choice; maintaining open account of award holder for further purchase of investment vehicle as preassigned credit award accumulations direct and providing statements of purchase and periodic statements of account transactions and status.

23 Claims, 2 Drawing Sheets

CENTRALIZED CREDIT INTERCHANGE SYSTEM OF CONVERTING PURCHASE CREDIT AWARDS THROUGH CREDIT EXCHANGE SYSTEM FOR PURCHASE OF INVESTMENT VEHICLE

DESCRIPTION OF THE PRIOR ART

Due to proliferation of award programs, issuers will need to structure programs to minimize cost of rewards at the same time maximizing appeal to consumers, to win market share due to increasing competitive market. The key to customer and credit card holder retention and loyalty is immediate or near immediate gratification. The potential of earning an investment opportunity and possible appreciation of the issuers reward can retain customers in an era when the costs to acquire new accounts are skyrocketing and where the effectiveness of new marketing is diminishing. The key today is offering a meaningful value-added proposition.

Airline frequent-flier programs and other reward programs are becoming so common customers are becoming used to rebate programs and are expecting them from merchants. Even though airline frequent-flier programs have been successful, the market is becoming saturated and consumers are becoming aware of frequent flier pitfalls such as frequent flier awards expiring poor availability of seats and available flying times. These and other award programs involve a considerable accumulation period to earn a benefit, have a ceiling on the award, or encourage consumers to charge excessively.

There is a rising concern of backlash from consumer groups and government over what might be viewed as encouragement from creditors for consumers to stay in debt.

This is especially applicable for supermarkets, discount retailers and gasoline stations which provide essential goods and services. Patrons of these establishments would be good potential users of the invention and save money through potential appreciation of investment as people do grocery shopping and buy gasoline more than anything else, which would include low income and disadvantaged people, who are hard pressed to save for investment income.

Clearly, there is a need in this environment for having rewards/credits tailored to a particular market, to meet the various needs of consumers w it no limit on accumulation periods, ceilings or expirations, but with greater competitive advantage to merchants, banks and other creditors, and, most importantly, for the consumer, potential appreciation of award through investment, thereby, effectively reducing the cost of interest on debt; amount of debt, with the potential of gaining from debt used in the form of credit.

OBJECTS AND ADVANTAGES

The object of the invention is to improve upon and remedy problems of the prior art discussed above by improving conventional credit cards, like credit vehicles and award programs, directed to methods for accumulating purchase/credit investment awards, and, also providing methods of converting such awards to an investment vehicle.

The objects of the invention are attained by providing a common interchange/exchange system capable of substituting or combining award programs and investment vehicles.

A further object of the invention is to provide a system including processing of acceptance and distribution of purchase credit awards by securing contract agreements with merchants, banks and other participants and converting awards into the purchase of an investment vehicle, e.g., mutual funds or other investment vehicle.

A further object of the invention is satisfying the needs of consumers to enable purchases, with their own money, earn potential investment appreciation by accumulating purchase investment credits, therefore, effectively, reducing debt through reduction in interest rate cost, balance reduction, by investment gain.

A further object of the invention is to provide a common interchange center/exchange system for exchanging purchase credits for insurance and annuity investments.

Another object of the invention is to provide credit cards; co-branded cards (cards that "rent space" with co-issuer); PIN cards (cards with magnetic strip that are "swiped" at point of purchase), rebates, or any form of credit award coordinated with participant giving purchase investment award to customer/consumer.

A further object of the invention allows consumers, (including the low income and disadvantaged, who are usually unable to save for investment), by utilizing their own money, (particularly on essential purchases such as food, clothing, gasoline, etc.), to earn investment potential by accumulating purchase award investment credits to be exchanged for a mutual fund or other investment vehicle.

A further object of the invention is to allow banks to create a partnership with a debtor by allowing a portion of the interest paid to be converted to award credit for potential investment return by the debtor. This method might limit banks' cash flow initially, but improve bottom line by attracting more card activations from cardholders. Banks may then utilize debt that has turned into appreciated assets and extend additional credit based on those assets.

A further object of the invention is using a software method for a system whereby purchase investment awards are converted to investment vehicles.

Other objects and features of the invention will become apparent from the following description in conjunction with the accompanying drawing. The drawing is designed solely for purposes of illustration and not as a definition of the limits of the invention, for which reference should be made to the appended claims.

DESCRIPTION OF THE DRAWING

The FIG. is a schematic diagram of a purchase investment credit award interchange and credit award exchange system clearing consumer incurred awards from point of sale transaction communicated via merchant or consumer implementing methods of the invention in or on a data processing system for conversion to investment in a mutual fund and/or investment vehicle utilizing invention data processing methods.

| Reference Numerals in Drawing | |
|---|---|
| 20 purchase credit award interchange and credit award exchange system | 52 communication line |
| | 54 input/output device |
| 22 purchase credit award interchange center | 58 communication line |
| 24 purchase credit award exchange center | 58 input/output device |
| 26 merchant | 60 member bank computer |
| 28 member bank | 62 common bus line |
| 28-A non-member bank | |

-continued

Reference Numerals in Drawing

Figure 1:
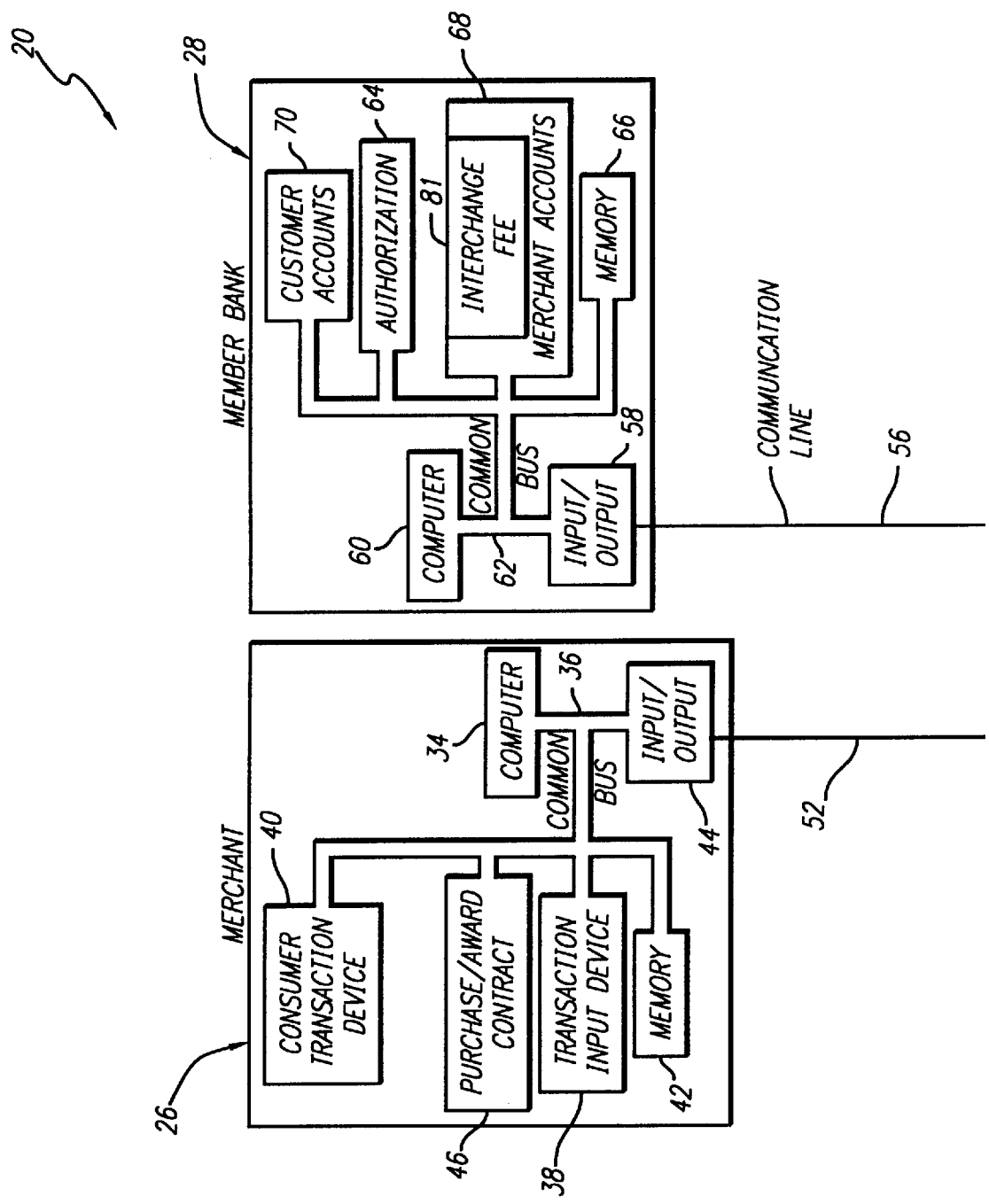
Figures 1, 2:
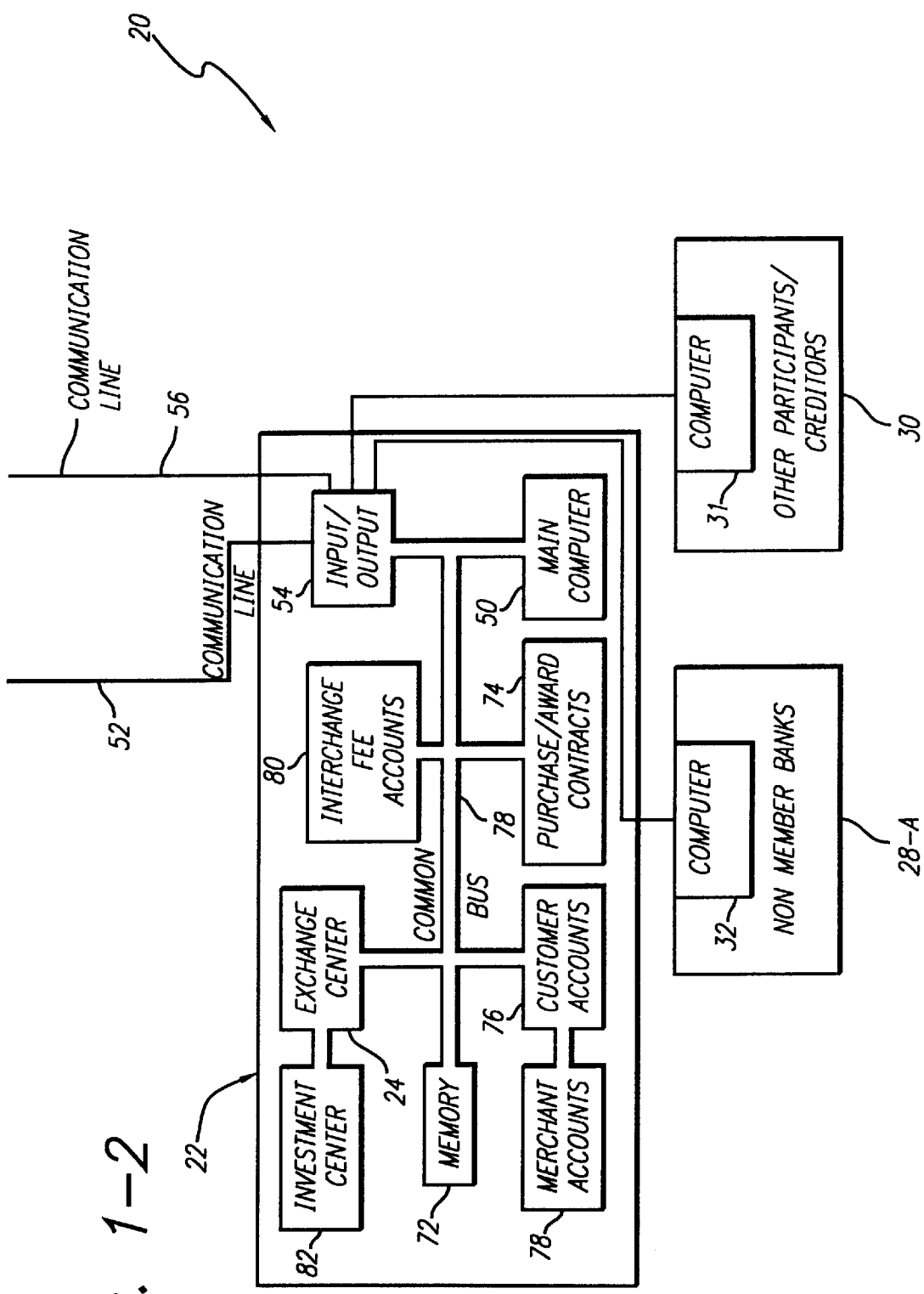

| | |
|---|---|
| 30 other participants/creditors | 64 authorization code |
| 31 other participants/creditors computer | 66 memory |
| 32 non-member bank computer | 68 merchant account |
| 34 merchant computer | 70 customer account |
| 36 common bus | 72 memory |
| 38 transaction input device | 74 purchase award contracts |
| 40 consumer transaction device | 78 customer account |
| 42 memory | 78 common bus |
| 44 imput/output device | 79 merchant account |
| 46 purchase award contract | 80 interchange fee account |
| 50 central system main computer | 81 interchange fee |
| | 82 investment center |

DETAILED DESCRIPTION OF THE INVENTION

Purchase credit award interchange and credit award exchange system 20 serves as a central system to initiate, receive and maintain credit award accounts and contract terms from merchant 26, member bank 28, other banks 28A and other participants/creditors 30 to be cleared and forwarded to credit award exchange 24, for exchange into a mutual fund or other investment vehicle.

With reference to the FIG., there is shown a purchase credit award interchange and credit award exchange system 20 having a central system comprising of credit interchange center 22 with credit award exchange 24 for communication with a plurality of merchants banks and other creditors. Each participant: merchant 26, banks 28-A; other creditors 30 have a computer 34 which communicates over a common bus 36 connecting with transaction input device 38, a memory 42 and input/output device 4.

One embodiment includes a consumer transaction device 40 that allows a consumer to input additional information, such as a personal identification number, at point of sale.

In one embodiment, credit interchange center 22 initiates and secures investment credit award contract 74 with merchant 26, other participants/creditors 30, banks 28-A and member bank 28. Each contract is stored in memory 72 or central system main computer 50. Although various elements are shown separately in the FIG. for clarity, it is to be understood that many of these elements can be physically combined. For example, customer account 76 may reside in memory 72, which in turn may reside in central system main computer 50.

The following description of merchant transaction from point of sale to culmination of investment purchase includes all transactions whether from merchant 26 or other participants/creditors 30. In other words, in a preferred embodiment bank 28-A includes the same software, features, and elements as bank 28 and other participant/creditor 30 includes the same software, features, and elements as merchant 26. Unless, according to award contract terms, one entity is optional or omitted, thereby, software would be programmed to interact with main computer 50 according to terms of participant award contract terms. In other words, in one embodiment, member bank 28 and non-member bank 28-A may convert interest paid by debtor to award credit for conversion to investment vehicle, thereby, omitting interaction with merchant software.

In a preferred embodiment, merchant 26 through transaction input device 38 at point of sale enters consumer transaction data which would contain, for example, merchant customer account number, customer name, amount credited, date, location of point of sale, items credited, and code number. If consumer data input is part of point of sale transaction, consumer transaction device 40 can be utilized and transaction data from either transaction input device 38 or consumer transaction device 40 may be stored in memory 42. Consumer transaction device 40 would be utilized by consumer In a physical act, such as inputting a personal identification number or swiping a form of award card. From memory 42, all transaction data will output to central system main computer 50 using input/output device 44 through communication line 52 to input/output device 54.

Merchant 26 and member bank 28 have assigned to them designated credit interchange account numbers. When sale/credit award transactions are received by central system main computer 50, memory 72 will match merchant 26 and member bank 28 designated account numbers to respective purchase credit award contract 74 stored in memory 72. Purchase award contract 74 utilizes an account number associated with the terms of contract for matching preassigned award credit per type of award vehicle used and credits customer account 76 with the proper amount of award credits.

Central system main computer 50, upon receipt of transaction data, communicates through communication line 56 to member bank 28, through input/output device 58 to bank computer 60, which interacts through common bus line 62 with merchant account 68, customer account 70 and authorization code 64 and accepts the transaction. Simultaneously, member bank 28 deducts interchange fee 81 from merchant account 68, sends interchange notification through common bus line 62 from memory 66 to input/output device 58 through communication line 56 to central system computer 50 to store in memory 72 as receiving and holding interchange fee 81 for transaction in interchange fee account 80. Central system main computer 50 now sends a command via communication line 56 to bank computer 60 to store in memory 66 consumer billing information and all further billing transactions. The manner in which finance charges, late fees, overdrawn fees, etc. are calculated and the factors and consideration applicable to such bank activities are known in the art and are outside the scope of the invention.

Upon completion of the billing transaction, credit interchange center 22 communicates to credit award exchange 24 which prepares and sends customer notice of proper authorizations and customer directives for signature per regulatory rules and regulations of investment vehicle. Upon return, customer directive is stored in customer account 76 awaiting conversion to investment vehicle upon accumulation of credits.

Central system main computer 50 functions in accordance with an operating program stored in memory 72 as to summing accumulating credit awards cleared through credit interchange center 22. When a preassigned award accumulation is reached, the data received by central system main computer 50 is sorted out by central system main computer 50 under control of an operating program located in memory 72. The customer account 76 number of the customer's award is located in memory 72. The award is converted to a cash value and an investment vehicle is purchased at investment center 82. The award customer is notified and data is transferred through common bus 78 into central system main computer 50 for monitoring customer investment account. A periodic statement is issued to the award customer showing account number, investment vehicle purchase, price paid and increment purchased, amount of accumulated credit awards used and amount of awards remaining. The periodic statement may also identify merchant 26 from whom credit award was awarded, how many credits were earned for items credited during the applicable period and how many award credit were used to purchase the investment vehicle.

While there have been shown and described and pointed out fundamental novel features of the invention as applied to embodiments thereof, it will be understood that various omissions and substitutions and changes in the form and details of the invention, as herein disclosed, may be made by those skilled in the art without departing from the spirit of the invention. It is expressly intended that all combinations of those elements and/or method steps which perform substantially the same function is substantially the same way to achieve the same results are within the scope of the invention. It is the intention, therefore, to be limited only as indicated by the scope of the claims appended hereto.

What is claimed:

1. A method for converting purchase credit awards resulting from a purchase by a consumer of goods or services into an ownership interest in an investment vehicle, the method comprising the steps of:
   a. crediting an account of the consumer with the credit awards;
   b. accumulating the credit awards in the account; and
   c. purchasing the ownership interest in the investment vehicle on behalf of the consumer with the credit awards in the accounts upon the credit awards reaching a predetermined level, the investment vehicle being subject to appreciation or depreciation.

2. The method of claim 1 wherein the investment vehicle is selected from a group of investment vehicles including a mutual fund, a bond, an insurance investment vehicle, and an annuity investment vehicle.

3. The method claim 2 wherein the mutual fund is selected from a group of mutual funds including a stock mutual fund, a money market fund, and a bond mutual fund.

4. The method of claim 1 wherein the purchase credit awards are associated with a credit card and the purchase utilizes the credit card.

5. The method of claim 1 wherein the step of purchasing the ownership interest in the investment vehicle comprises the steps of:
   determining a current market value associated with the investment vehicle;
   determining an amount of ownership interest that can be purchased in the investment vehicle based upon the accumulated credit awards; and
   converting the credit awards into the ownership interest in the investment vehicle.

6. The method of claim 5 wherein the step of converting the credit awards into the ownership interest includes the steps of:
   accessing a database to determine legal requirements necessary for consummating the purchase of the ownership interest in the investment vehicle;
   generating forms representative of the legal requirements;
   forwarding the forms to the purchaser for signature;
   receiving the forms from the purchaser, verifying the presence of the signatures, and completing the purchase of the ownership interest in the investment vehicle on behalf of the purchaser.

7. The method of claim 1 further including the steps of:
   generating a report for each consumer of the ownership interest, if any, purchased on behalf of the consumer in the investment vehicle; and forwarding the report to the consumer.

8. The method of claim 7 wherein the steps of generating the report and forwarding the report to the consumer are performed periodically.

9. The method of claim 1 wherein, after the purchase of the ownership interest in the investment vehicle is made, any interest or dividends from the investment vehicle are automatically reinvested in the investment vehicle on behalf of the consumer.

10. A method for converting purchase credit awards resulting from a purchase by a consumer of goods or services into an ownership interest in an investment vehicle, the method comprising the steps of:
    a. assessing the merchant an interchange fee associated with the purchase and depositing at least a portion of the interchange fee in an interchange fee account;
    b. crediting a credit awards account of the consumer with credit awards associated with the purchase;
    c. accumulating credit awards in the credit awards account;
    d. upon the credit awards reaching a predetermined value, withdrawing at least a portion of the interchange fee in the interchange fee account;
    e. purchasing an ownership interest in the investment vehicle on behalf of the consumer using the portion of the interchange fees withdrawn from the interchange account, with the investment vehicle being subject to appreciation or depreciation.

11. The method of claim 10 wherein the investment vehicle is selected from a group of investment vehicles including a mutual fund, a bond, an insurance investment vehicle, and an annuity investment vehicle.

12. The method claim 11 wherein the mutual fund is selected from a group of mutual funds including a stock mutual fund, a money market fund, and a bond mutual fund.

13. The method of claim 10 wherein the purchase credit awards are associated with a credit card and the purchase utilizes the credit card.

14. The method of claim 10 wherein the step of purchasing the ownership interest in the investment vehicle comprises the steps of:
    determining a current market value associated with the investment vehicle;
    determining an amount of ownership interest that can be purchased in the investment vehicle based upon the accumulated credit awards; and
    converting the credit awards into the ownership interest in the investment vehicle.

15. The method of claim 14 wherein the step of converting the credit awards into the ownership interest includes the steps of:
    accessing a database to determine legal requirements necessary for consummating the purchase of the ownership interest in the investment vehicle;
    generating forms representative of the legal requirements;
    forwarding the forms to the purchaser for signature;
    receiving the forms from the purchaser, verifying the presence of the signatures, and completing the purchase of the ownership interest in the investment vehicle on behalf of the purchaser.

16. The method of claim 10 further including the steps of:

generating a report for each consumer of the ownership interest, if any, purchased on behalf of the consumer in the investment vehicle; and forwarding the report to the consumer.

17. The method of claim 16 wherein the steps of generating the report and forwarding the report to the consumer are performed periodically.

18. The method of claim 17 wherein, after the purchase of the ownership interest in the investment vehicle is made, any interest or dividends from the investment vehicle are automatically reinvested in the investment vehicle on behalf of the consumer.

19. The method of claim 10 wherein a plurality of purchases are made by the consumer, each resulting in an interchange fee being assessed to the merchant, the interchange fees being accumulated, and wherein the purchase of the ownership interest is funded by at least a portion of the accumulated interchange fees.

20. A method for converting credit awards resulting from a purchase by a consumer of goods or services into an ownership interest in an investment vehicle, the method comprising the steps of:

a. crediting an account of the consumer with the credit award;

b. accumulating the credit awards in the account; and c. periodically purchasing the ownership interest in the investment vehicle on behalf of the consumer with the credit awards, the investment vehicle being subject to appreciation or depreciation.

21. A method for converting credit awards resulting from credit card interest payments by a consumer to a bank into an ownership interest in an investment vehicle, the method comprising the steps of:

a. crediting an account of the customer with the credit awards;

b. accumulating the credit awards in the account; and c. purchasing the ownership interest in the investment vehicle on behalf of the consumer with the credit awards in the accounts upon the credit awards reaching a predetermined level, the investment vehicle being subject to appreciation or depreciation.

22. An electronic data processing device for converting purchase credit awards resulting from a purchase by a consumer of goods or services into an ownership interest in an investment vehicle, the device comprising:

means for crediting an account of the consumer with the credit awards;

means for accumulating the credit awards in the accounts; and means for purchasing the ownership interest in the investment vehicle on behalf of the consumer with the credit awards in the accounts upon the credit awards in the account reaching a predetermined level, the investment vehicle being subject to appreciation or depreciation.

23. An electronic data processing device for converting purchase credit awards resulting from a purchase by a consumer of goods or services into an ownership interest in an investment vehicle, the device comprising:

an account processing unit for crediting an account of the consumer with the credit awards;

a credit award accumulation unit for accumulating the credit awards in the accounts; and an investment vehicle purchase processing unit for purchasing the ownership interest in the investment vehicle on behalf of the consumer with the credit awards in the accounts upon the credit awards in the account reaching a predetermined level, the investment vehicle being subject to appreciation or depreciation.

* * * * *